(12) United States Patent
Stubler

(10) Patent No.: US 8,270,682 B2
(45) Date of Patent: Sep. 18, 2012

(54) HAIR SEGMENTATION

(75) Inventor: Peter O. Stubler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 967 days.

(21) Appl. No.: 12/277,969

(22) Filed: Nov. 25, 2008

(65) Prior Publication Data

US 2010/0128939 A1 May 27, 2010

(51) Int. Cl.
*G06K 9/00* (2006.01)
(52) U.S. Cl. .................. 382/118; 382/195; 382/171
(58) Field of Classification Search .................. 382/118, 382/162, 164, 171, 195, 199; 351/204
See application file for complete search history.

(56) References Cited

U.S. PATENT DOCUMENTS

| | | | |
|---|---|---|---|
| 5,430,809 A | 7/1995 | Tomitaka | |
| 5,631,975 A | 5/1997 | Riglet et al. | |
| 5,812,193 A | 9/1998 | Tomitaka et al. | |
| 6,711,286 B1 | 3/2004 | Chen et al. | |
| 6,862,374 B1 | 3/2005 | Nagai et al. | |
| 6,940,545 B1 | 9/2005 | Ray et al. | |
| 2004/0170337 A1 | 9/2004 | Simon et al. | |
| 2004/0179736 A1 | 9/2004 | Yin | |
| 2005/0117779 A1 | 6/2005 | Horie et al. | |
| 2005/0175227 A1 | 8/2005 | Paschalakis | |
| 2007/0003113 A1* | 1/2007 | Goldberg | 382/118 |
| 2007/0071314 A1* | 3/2007 | Bhatti et al. | 382/162 |
| 2008/0080745 A1 | 4/2008 | Vanhoucke et al. | |
| 2009/0196510 A1* | 8/2009 | Gokturk et al. | 382/224 |

FOREIGN PATENT DOCUMENTS

WO 2006/122164 11/2006

OTHER PUBLICATIONS

Yasser Yacoob and Larry Davis, Detection , Analysis, and Matching of Hair, Tenth IEEE International Conference on Computer Vision (ICCV'05), vol. 1, pp. 741-748 (To Follow).
Zhi-Qiang Liu and Jessica Y. Guo, A Model-based Approach to Hair Region Segmentation, International Journal of Image and Graphics, vol. 3, No. 3 (2003), pp. 481-501 (To Follow).
"Detection, Analysis, and Matching of Hair", Yasser Yacoob and Larry Davis, Tenth IEEE International Conference on Computer Vision (ICCV'05) vol. 1 pp. 741-748.
"A Model-based Approach to Hair Region Segmentation", Zhi-Qiang Liu and Jessica Y. Guo, International Journal of Image and Graphics, vol. 3, No. 3 (2003), pp. 481-501.
Huang G. B. et al. "Towards unconstrained face recognition" Computer Vision and Pattern Recognition Workshops, 2008. CVPR Workshops 2008. IEEE Computer Society Conference on, IEEE, Piscataway, NJ, USA, Jun. 23, 2008, pp. 1-8, XP031285529.

(Continued)

*Primary Examiner* — Ali Bayat
(74) *Attorney, Agent, or Firm* — Kevin E. Spaulding

(57) ABSTRACT

Segmenting scalp and facial hair of a human subject depicted in an image by identifying from metadata associated with the image or semantic information extracted from the image information indicating a possible distribution of the scalp hair or the facial hair, identifying from hair distribution information an expected-hair region within the image wherein the expected-hair region includes at least a portion of a head area of the subject, and identifying a hair region within the expected hair region.

6 Claims, 7 Drawing Sheets

OTHER PUBLICATIONS

Kuang-Chih Lee et al. "Markov random field models for hair and face segmentation" 8th IEEE International Conference on Automatic Face & Gesture Recognition, FG '08, Sep. 17-19, 2008, IEEE, Piscataway, NY, USA, Sep. 17, 2008; pp. 1-6, XP032448467; ISBN: 978-1-4244-2153-4.

Rousset c. et al. "Frequential and color analysis for hair mask segmentation" Image Processing, 2008. ICIP 2008, 15th IEEE International Conference, IEEE, Piscataway, NJ, USA, Oct. 12, 2008, pp. 2276-2279, XP031374492, ISBN: 978-1-4244-1765-0.

Dragomir Anguelow et al, "Contextual Identity Recognition in Personal Photo Albums" Computer Vision and Pattern Recognition 2007, CVPR '07. IEEE Conference on, IEEE, Piscataway, NY, USA, Jun. 1, 2007, pp. 1-7, XP031114314; ISBN: 978-1-4244-1179-5.

Yang Song et al, "Context-Aided Human Recognition—Clustering" Jan. 1, 2006, Computer Vision—ECCV 2006 Lecture Notes in Computer Science; LNCS, Springer, Berlin, De, pp. 382-395, XP019036503, ISBN: 9783540338369.

\* cited by examiner

HAIR SEGMENTATION

FIELD OF THE INVENTION

This invention generally relates to image analysis techniques and more particularly relates to segmentation methods for identifying areas having various types of content within a digital image.

BACKGROUND

Systems and methods for the automatic detection, analysis and recognition of facial features find application in a wide range of fields, including, for example, automatic facial and silhouette recognition, identification and tracking systems employed in security system applications. Such systems may include, for example, identification badge systems, personnel recognition systems and area security systems, including systems operating in densely populated areas such as airports and other transportation and shipping facilities and entertainment and sports venues. Such methods and systems also find a wide range of applications in such commercial and consumer applications as image and photograph processing systems, including automatic color correction systems, photographic editing systems and automatic photomontage systems.

Facial feature recognition systems may employ a variety of methods to identify facial images appearing in a scene and to identify the component elements of each face, including such methods as morphological analysis, pattern recognition and image template matching methods. One of the most frequently used methods, however, is hair segmentation, which is a process by which that portion or portions of an image that represents hair can be distinguished from other portions of an image that may represent, for example, skin, clothing, or other objects.

Conventional hair segmentation methods of the prior art, however, have primarily been designed to distinguished between hair and skin by detecting differences between the visual characteristics of skin and hair to thereby define the boundary of facial skin areas in an image. The methods of the prior art, however, rely upon there being a strong value contrast or other strong visual characteristic difference, such as color, between the facial skin and hair or between hair and, for example, background elements of the image.

For example, the method described in U.S. Pat. No. 5,631,975 to Riglet et al. for an "Image Segmentation Device" describes a method for identifying areas of an image containing hair by using luminance differences to identify the skin/hair and hair/background boundaries. U.S. patent application Ser. No. 20050117779(A1) by Daisaku Horie and Yuusuke Nakano for an "Object Detection Apparatus, Object Detection Method and Computer Program Product" describes a method using chromaticity values to detect flesh and hair areas of pedestrian images. U.S. patent application Ser. No. 20050175227(A1) by Stavros Paschalakis for a "Method and Apparatus for Separating Hair and Skin in Images" describes a method for identifying hair areas of an image by identifying and excluding skin colored pixels from a skin map. In a further example, U.S. Pat. No. 5,430,809 to Tomitaka for a "Human Face Tracking System" and U.S. Pat. No. 5,812,193 to Tomitaka et al. for a "Video Camera System Which Automatically Follows Subject Changes", identify areas of skin and hair in an image by tesselating an image into tiles, comparing the colors, hues or hue angles of each tile area with standard skin hues, and identifying as hair areas those tiles having skin hues of sufficient darkness.

More recently developed methods of the prior art for hair segmentation in images employs the above described methods based on skin/hair/background luminance, hue and chromaticity values with methods for recognizing and identifying the geometric structure of a facial image. For example, U.S. Pat. No. 6,862,374 to Yoshinori Nagai, Hajime Takezawa, Kazuhiro Saiki, Toshiya Takahashi and Kyouichi Suzuki for an "Image Processing Device, Image Processing Method, and Recording Medium Storing the Image Processing Method", describes a method wherein an image of a face is represented as a simple geometric shape against a uniform background and image pixels are identified as containing or not containing hair by pixel chromaticity, and hair regions are identified by hair/no hair border tracing within smaller windows.

"Detection, Analysis, and Matching of Hair", Yasser Yacoob and Larry Davis, Tenth IEEE International Conference on Computer Vision (ICCV'05) Volume 1 pp. 741-748 is primarily focused on methods for the calculation of hair similarity after the hair has been segmented, but includes some description of a hair segmentation method. According to Yasser Yacoob and Larry Davis, the hair segmentation method is comprised of the steps of (a) detecting within an image a frontal image of a face against a plain background, (b) detecting the location of eyes within the face shape, (c) modeling the skin color within the face shape by color analysis, and (d) modeling the hair color by color analysis. It should be noted, however, that Yasser Yacoob and Larry Davis state that the method has difficulty in differentiating the hair/background border and with subjects having little or no hair.

In a final example, "A Model-based Approach to Hair Region Segmentation", Zhi-Qiang Liu and Jessica Y. Guo, International Journal of Image and Graphics, Volume 3, Number 3 (2003), pages 481-501, describes a method for hair segmentation that relies upon a frontal facial image and a strong contrast between the outside border or the hair and the image background and describes morphological processes that may be used to generate a hair region map.

The methods of the prior art thereby rely upon there being a substantial contrast or other strong visual characteristic difference, such as color, between the facial skin and hair or between hair and, for example, background elements of the image. As a consequence, these methods of the prior art often ineffective or unreliable in situations wherein the contrast or visual characteristics differences between the areas of image are not strong or where some areas of an image, such as the background, are complicated or cluttered. It should also be noted that many if not most of the face recognition methods of the prior art also require that the facial images be substantially frontal views of the subject's face in order to identify and segment the various areas of the subject's face.

Therefore, while such methods of the prior art have shown some limited capability in distinguishing areas of skin from areas of hair, they have also shown a limited capability in distinguishing hair from other areas appearing in an image, such as background elements, and particularly in cluttered images such as found in consumer/commercial photography and in securing systems dealing with densely populated areas. Consumer images and images of densely populated areas, however, typically include multiple people in any number of positions or poses and against any of a number of types of backgrounds and backgrounds having considerably varied content, including backgrounds containing large numbers of closely spaced or even overlapping faces. Moreover, hair colors and styles can vary widely across the population and methods that use only luminance, chromaticity, hue, or other color space data can be inadequate to the task of hair segmentation for images obtained by the broad base of digital camera users. It should also be noted that not only do the methods of the prior art require uniform backgrounds and impose tightly constrained facial positions and angles, they also show little or no capability in dealing with factors such as subject age or gender and the correlation of these factors to the probable distribution of hair belonging to the subject. The systems of the prior art, for example, often exhibit difficulty in image assessment with subjects having little or no hair or facial hair such as a beard or moustache.

The present invention provides a solution to these and other related problems of the prior art.

SUMMARY OF THE INVENTION

The present invention is directed to a method and system for detecting scalp or facial hair of a human subject depicted in a digital image.

The method of the present invention includes the steps of (a) receiving a digital image, (b) identifying at least one of (i) gender information indicating a gender of the human subject, (ii) age information indicating an age or approximate age of the human subject, or (iii) hair characteristic information indicating a set of hair characteristics associated with the human subject, (c) identifying an expected-hair region within the digital image based at least upon the identified information, the expected-hair region inclusive of at least a portion of a head to the human subject, and (d) identifying a hair region within the expected hair region.

The method of the present invention also includes steps for detecting scalp or facial hair of a human subject depicted in a digital image and implemented at least in part by a computer system, including obtaining a digital image from a digital image-record collection, linking the digital image to a variable amount of image metadata including semantic information relating to the content of the image and structural information relating to conditions under which the image was captured, identifying (a) gender information indicating a gender of the human subject, (b) age information indicating an age or approximate age of the human subject, or (c) hair characteristic information indicating a set of hair characteristics associated with the human subject, identifying an expected-hair region within the digital image based at least upon the identified information, the expected-hair region inclusive of at least a portion of a head to the human subject, identifying a hair region within the expected hair region, and using the information pertaining to the identified hair region with at least one of a computer software program and a computer-accessible memory to provide various functional outputs relative to the digital image.

In certain embodiments of the present invention the types of image subject information that may be used in detecting scalp of facial includes the identify of the person in the image. It should also be noted that the information provided by the method of the present invention as pertaining to identified hair regions images may be stored in, for example, a computer or system for subsequent use, as in re-identifying that person or to assist in identifying other persons or in distinguishing between persons.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

Figure 1:
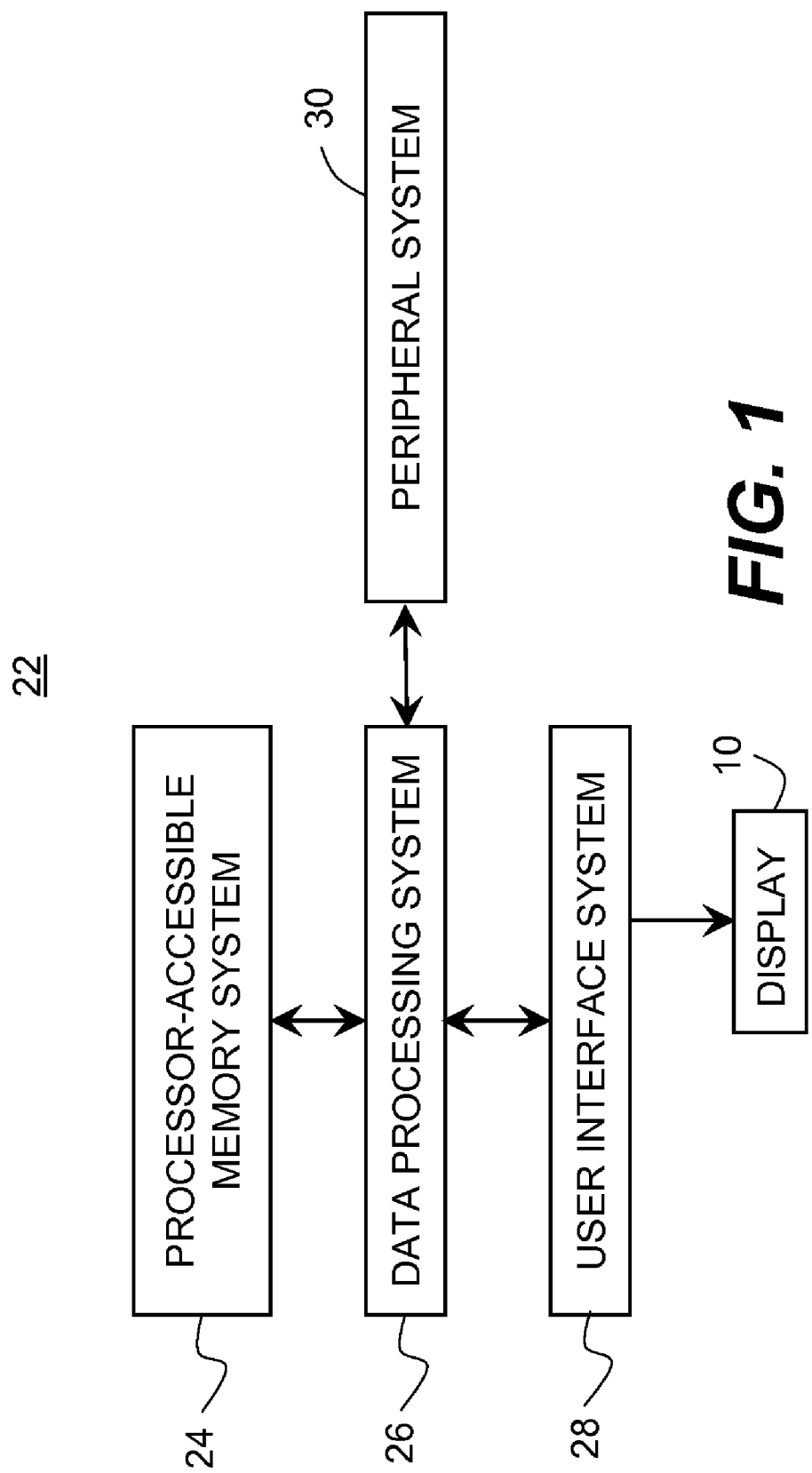
FIG. 1 illustrates a system for providing hair segmentation according to an embodiment of the present invention.

It is to be understood that the attached drawings are for purposes of illustrating the concepts of the invention and may not be to scale.

DETAILED DESCRIPTION

For purposes of the present descriptions of the invention, the phrase "digital image" as used herein, is intended to include digital still images as well as digital video. The phrases "data processing device" or "data processor" are intended to include any data processing device, such as a central processing unit ("CPU"), a desktop computer, a laptop computer, a mainframe computer, a personal digital assistant, a handheld computer/communications device such as a Blackberry™, a digital camera, cellular phone, or any other device for processing data, managing data, or handling data, whether implemented with electrical, magnetic, optical, biological components, or otherwise. In addition, the phrase "processor-accessible memory" is intended to include any processor-accessible data storage device, whether volatile or nonvolatile, electronic, magnetic, optical, or otherwise, including but not limited to, floppy disks, hard disks, Compact Discs, DVDs, flash memories, ROMs, and RAMs. The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all.

Also, it should be noted that, unless otherwise explicitly noted or required by context, the word "or" is used in this disclosure in a non-exclusive sense. In addition, functions described herein may be implemented as "software" or "software programs". Those skilled in the art will recognize, however, that the equivalent functions of such software can also be readily executed in hardware.

The following will describe embodiments of systems and methods of the present invention, which may be implemented at least in part in a computer system, for providing hair segmentation by detecting scalp or facial hair of a human subject depicted in a digital image. As will be described in detail in the following, the method and system of the present invention identifies gender information indicating a gender of the human subject, age information indicating an age or approximate age of the human subject and hair characteristic information indicating a set of hair characteristics associated with the human subject. An expected-hair region within the digital image is then identified, based at least upon the identified information, wherein the expected-hair region is inclusive of at least a portion of a head to the human subject. A hair region is identified within the expected hair region, and information pertaining to the identified hair region then stored in, for example, a computer-accessible memory for subsequent use.

FIG. 1 illustrates an exemplary system 22 for providing hair segmentation for a digital image according to an embodiment of the present invention in an information processing system such as a computer or computer system or network. As shown, system 22 includes a data processing system 26, a peripheral system 30, a user interface system 28, a processor-accessible memory system 24 and a display 10. Processor-accessible memory system 24, peripheral system 30, user interface system 28 and display 10 are communicatively connected to data processing system 26. Data processing system 26 includes one or more data processing devices that implement the processes of the various embodiments of the present invention, including the example processes of FIG. 2 described herein.

Figure 2:
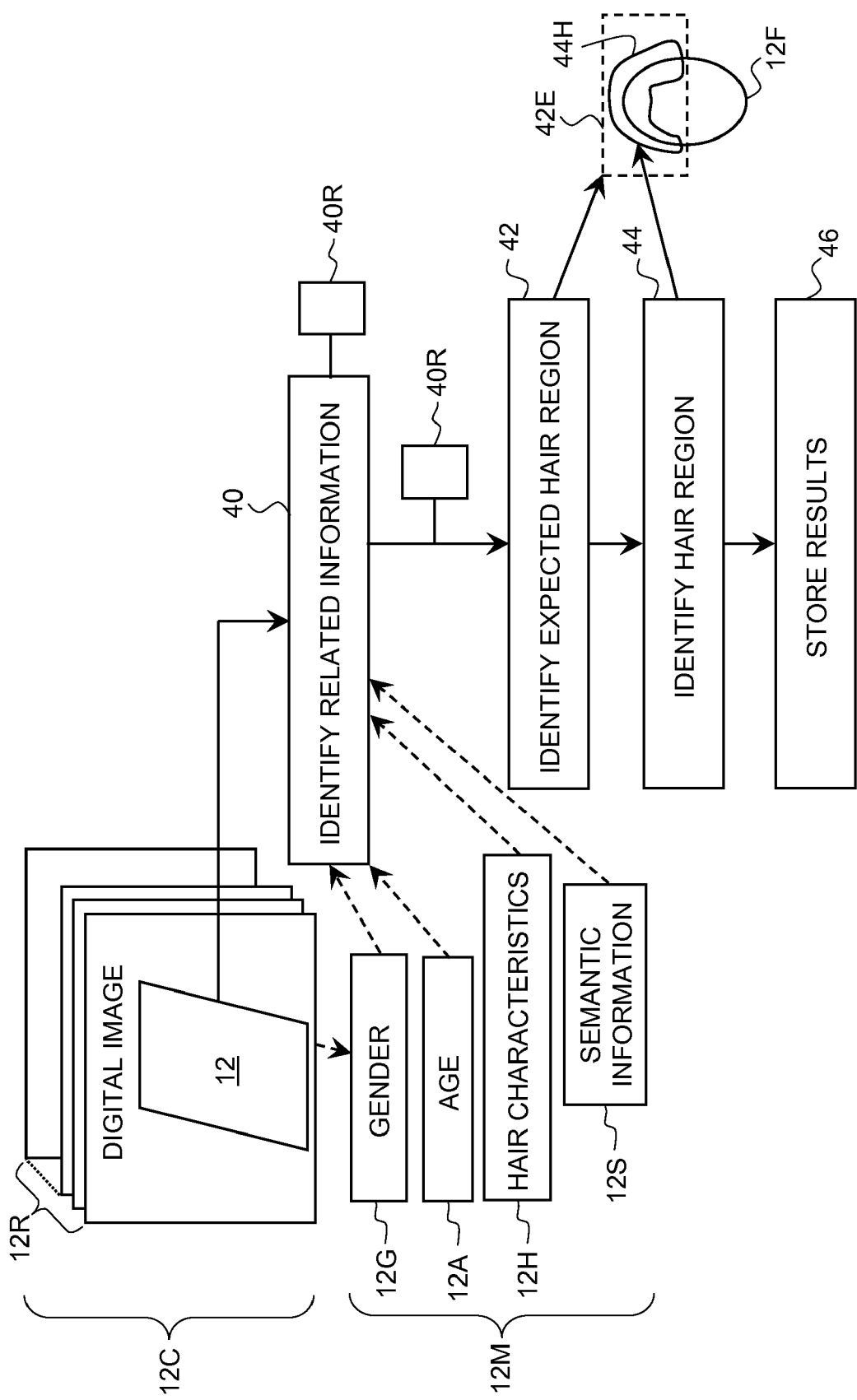
FIG. 2 is a block diagram of steps for providing hair segmentation for a digital image.

The processor-accessible memory system 24 includes one or more processor-accessible memories configured to store information, including the information, that is, programs, needed to execute the processes of the various embodiments of the present invention, including the example processes of FIG. 2 described herein. The processor-accessible memory system 24 may be a distributed processor-accessible memory system including multiple processor-accessible memories communicatively connected to the data processing system 26 via a plurality of computers and/or devices. On the other hand, the processor-accessible memory system 24 need not be a distributed processor-accessible memory system and, consequently, may include one or more processor-accessible memories located within a single data processor or device.

In this regard, although the processor-accessible memory system 24 is shown separately from the data processing system 26, one skilled in the art will appreciate that the processor-accessible memory system 24 may be stored completely or partially within the data processing system 26. Further in this regard, although the peripheral system 30 and the user interface system 28 are shown separately from the data processing system 26, one skilled in the art will appreciate that one or both of such systems may be stored completely or partially within the data processing system 26.

The peripheral system 30 may include one or more devices configured to provide digital image records to the data processing system 26. For example, the peripheral system 30 may include digital video cameras, cellular phones, regular digital cameras, or other computers. The data processing system 26, upon receipt of digital image records from a device in the peripheral system 30, may store such digital image records in the processor-accessible memory system 24.

The user interface system 28 may include a mouse, a keyboard, another computer, or any device or combination of devices from which data is input to the data processing system 26. In this regard, although the peripheral system 30 is shown separately from the user interface system 28, the peripheral system 30 may be included as part of the user interface system 28.

The user interface system 28 also includes a display device 10 and a processor-accessible memory, or any device or combination of devices to which data is output by the data processing system 26. In this regard, if the user interface system 28 includes a processor-accessible memory, such memory may be part of the processor-accessible memory system 24 even though the user interface system 28 and the processor-accessible memory system 24 are shown separately in FIG. 1.

Before beginning detailed descriptions of the present invention, it must first be noted that certain of the methods, processes and algorithms for the detection, extraction, analysis, identification and recognition of faces and features and the identification of individuals are described, for example, in U.S. Pat. No. 7,218,759" to Ho et al. for "Face Detection in Digital Images, U.S. Pat. No. 7,110,575 to Chen et al. for a "Method for Locating Faces in Digital Color Images", U.S. Pat. No. 7,142,697 to Huang et al. for a "Pose-Invariant Face Recognition System and Process", U.S. Pat. No. 6,940,545" to Ray et al. for a "Face Detecting Camera and Method, U.S. Pat. No. 7,110,575 to Chen et al. for a "Method for Locating Faces in Digital Color Images", and U.S. Pat. No. 7,082,211 B2 to Bolin for a "Method and System for Enhancing Portrait Images". Likewise, pose estimation methods for obtaining approximate head orientation of a subject are described by Cootes, et. al. in "View-based active appearance models," Proceedings of the IEEE International Conference on Face and Gesture Recognition, pages 227-232, 2000 and methods for the extraction or obtaining of age and gender information are described in B. Moghaddam and M. H. Yang, "Gender Classification with Support Vector Machines" in Proc. of 4th IEEE Int'l Conf. On Face & Gesture Recognition, March 2000, and U.S. Pat. No. 5,781,650 to Lobo and Kwon.

These references are accordingly incorporated herein by reference.

Referring to FIG. 2, therein is shown a logic flow diagram of a method for detecting scalp or facial hair of a human subject in one embodiment of the present invention while FIGS. 3, 4 and 5A-5B illustrate further an alternate embodiments and further details of embodiments of the present invention.

As illustrated in FIG. 2, a digital image 12 containing a human subject may be and is assumed to have been obtained from any of a number of possible sources, including a digital camera, film scanner, or other device and is incorporated into an image record 12R wherein image records 12R are comprised of one or more digital images 12 and are stored in a digital image-record collection 12C in a processor-accessible memory system 24.

As also shown, a digital image 12 may be linked to a variable amount of image metadata 12M wherein image metadata 12M can include various semantic and structural information 12S related to the conditions under which the image was captured as well as information obtained about image contents. For example, and in particular with regard to the present invention, metadata 12M may include such as gender information 12G, approximate or exact age 12A, and hair characteristics 12H. Metadata 12M for a digital image record 12R may further include date and time of image 12 capture, the capture location (provided by a Global Positioning Satellite, GPS, for example), camera owner, camera type, image resolution, comments from the operator or viewer of the image, and various data obtained from the image content itself, including information identifying the subject(s) of the image, for example. Semantic information 12S obtained and stored as metadata 12M for a digital image record 12R can include various information obtained from objects in the image, including data from image analysis tools known in the art, such as various software applications providing object recognition or face recognition, as noted previously.

Referring therefore to the method steps illustrated in FIG. 2, an information identification step 40 identifies any related information 40R about the subject, such as gender information 12G, approximate or exact age 12A, and hair characteristics 12H associated with the subject. Based at least in part on the identified information from step 40, an expected hair region 42E in a facial image 12F is identified in a subsequent step 42. Then, in a hair region identification step 44, a hair region 44H within the expected hair region 42E is identified.

Information pertaining to the identified hair region 44H is then stored in a computer-accessible memory in a storage step 46.

It should be noted that, according to the present invention, each step in the basic embodiment illustrated in FIG. 2 admits a number of alternatives. For example, identification step 40 can take advantage of a range of metadata 12M other than such as gender information 12G, approximate or exact age 12A, and hair characteristics 12H that can also be associated with a digital image 12. For example, the digital camera or other capture device can store various types of metadata 12M that pertain to an image 12, such as time of image capture, Global Positioning Satellite (GPS) coordinates, capture device type, and other data. Image collections 12C can further include utilities that obtain semantic information 12S from the image 12 and are able to identify objects and even specific individuals in the digital image 12. Clues from semantic information 12S, obtained from features such as clothing, facial shape, eyebrow shape and size and other facial features, can be used to determine the likely age and gender of an imaged human subject.

The information 40R relating to human subjects in a digital image 12, obtained in step 40, can be of particular value for the task of hair detection and extends the capabilities of conventional hair detection utilities that use pixel color or require only a limited range of poses in order to accurately detect hair regions. For example, knowing something of the age of the subject can enable appropriate sensitivity to hair color and texture. Knowing whether the subject is male or female can be helpful for instructing algorithms designed to detect facial hair. The more detailed this information, the higher degree of accuracy is likely from hair detection in step 44. In one embodiment, the identity of a person in the digital image is known. This enables the use of other metadata 12M about that person and other images 12 that include that person, so that detection of scalp or facial hair is more an informed process than a blind search.

Identification of an expected hair region 42E in step 42 uses related identification information 40R obtained from step 40 and, depending on how much information 40R is known, a more or less accurate set of assumptions can be followed for identifying an expected hair region 42E. For example, the method of the present invention uses the expected hair region 42E as a well-defined region within which routines in hair region identification step 44 that detect likely hair color and texture can examine image content for hair detection.

The results of hair detection in step 42 can be used or stored with the image 12 or in a separate memory area. These results can be used in a number of ways, such as with software that performs various facial transformations, in entertainment venues, and for heightened identification or security applications, for example.

Figure 3:
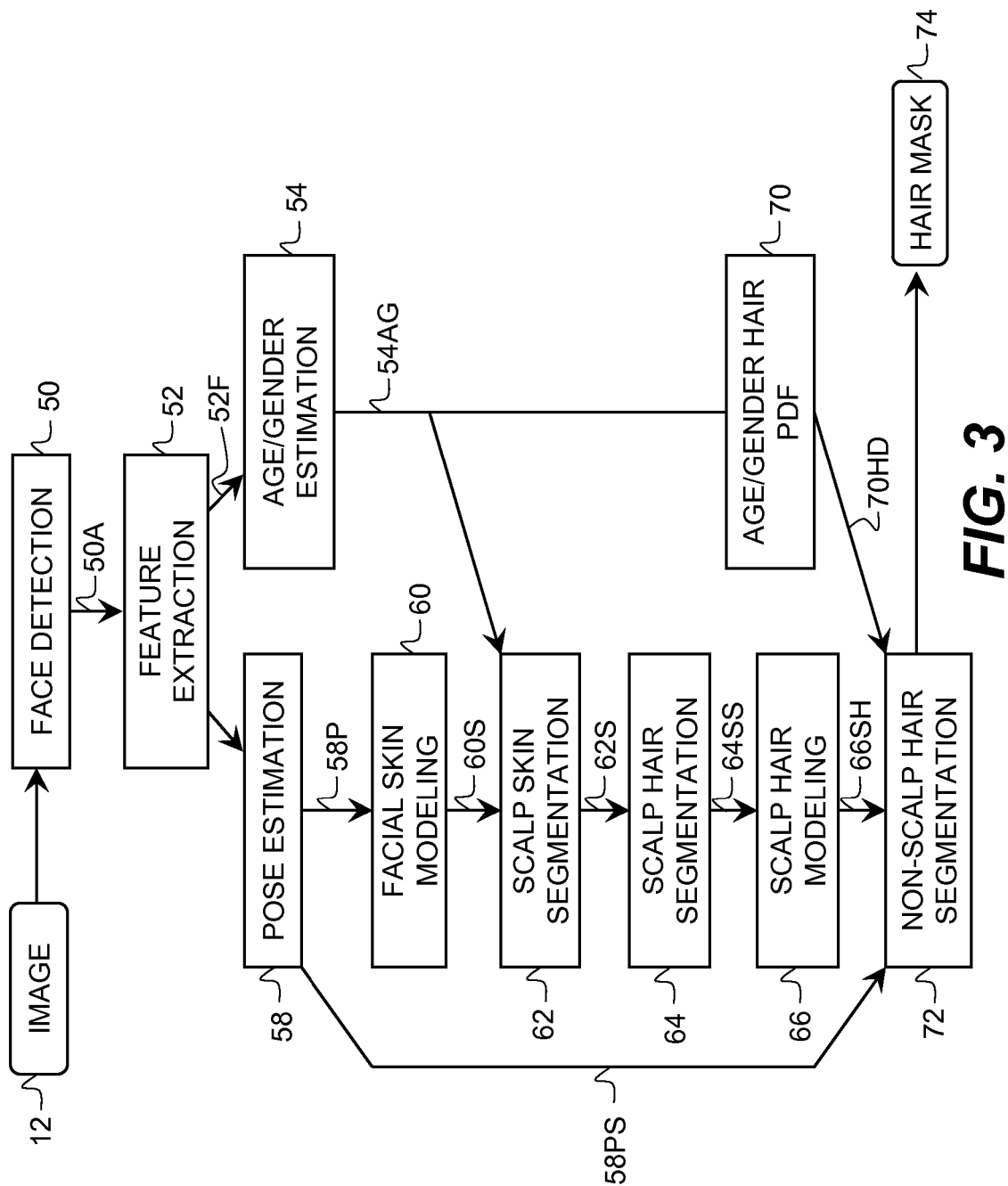
FIG. 3 is a logic flow diagram showing steps for forming a hair mask in one embodiment.

The method of the present invention may take advantage of previously provided and stored metadata 12M for the image 12 or may use automated techniques to obtain at least some metadata 12M about an image directly from image 12 content. For example, the logic flow sequence shown in FIG. 3 shows an exemplary sequence for identifying a hair region 44H in an embodiment of the method of the present invention for which no prior knowledge of the subject is needed. Digital image 12 is provided to a face detection step 50 that defines an area 50A of a face within an image 12. A feature extraction step 52 then extracts key features 52F that can be used to determine characteristics such as gender, age, and head position or pose from that facial area 50A. Features 52F information obtained in feature extraction step 52 then goes to an age/gender estimation step 54. Here, various information 54AG about the age and gender of each human subject in the image 12 can be inferred from the extracted features 52F. Features 52F information from feature extraction step 52 also goes to a pose estimation step 58, which enables an improved definition of head position 58P to be obtained so that hair location can be more readily identified. A facial skin modeling step 60 follows wherein the relative position 60S of facial skin is located, based on pose estimation 58P from step 58. Next, a scalp segmentation step 62 uses image processing tools to define scalp 62S as distinct from skin. A subsequent scalp hair segmentation step 64 segments the scalp hair as a well-defined area 64SS. A scalp hair modeling step 66 analyzes the scalp hair segment 64SS in order to obtain characteristic information 66SH about scalp hair.

Pose estimation step 58 also provides information 58PS to a non-scalp hair segmentation step 72, which also obtains age/gender hair density information 70HD from an age/gender hair Probability Density Function (PDF) step 70 which receives age/gender information 54AG from age/gender estimation step 54. Non-scalp hair segmentation step 72 may then determine an expected hair region 42E and hair region 44H from age/gender hair density information 70HD and age/gender information 54AG, or a hair mask 74 delineating the hair region 44H.

As noted in the flowchart of FIG. 3, age and gender estimation from age/gender estimation step 54 can help as an input to scalp skin segmentation step 62. That is, age and gender information 54AG can help to determine what types of facial hair are typical and what scalp hairstyles may apply for a subject of the identified age and gender.

Figure 3A:
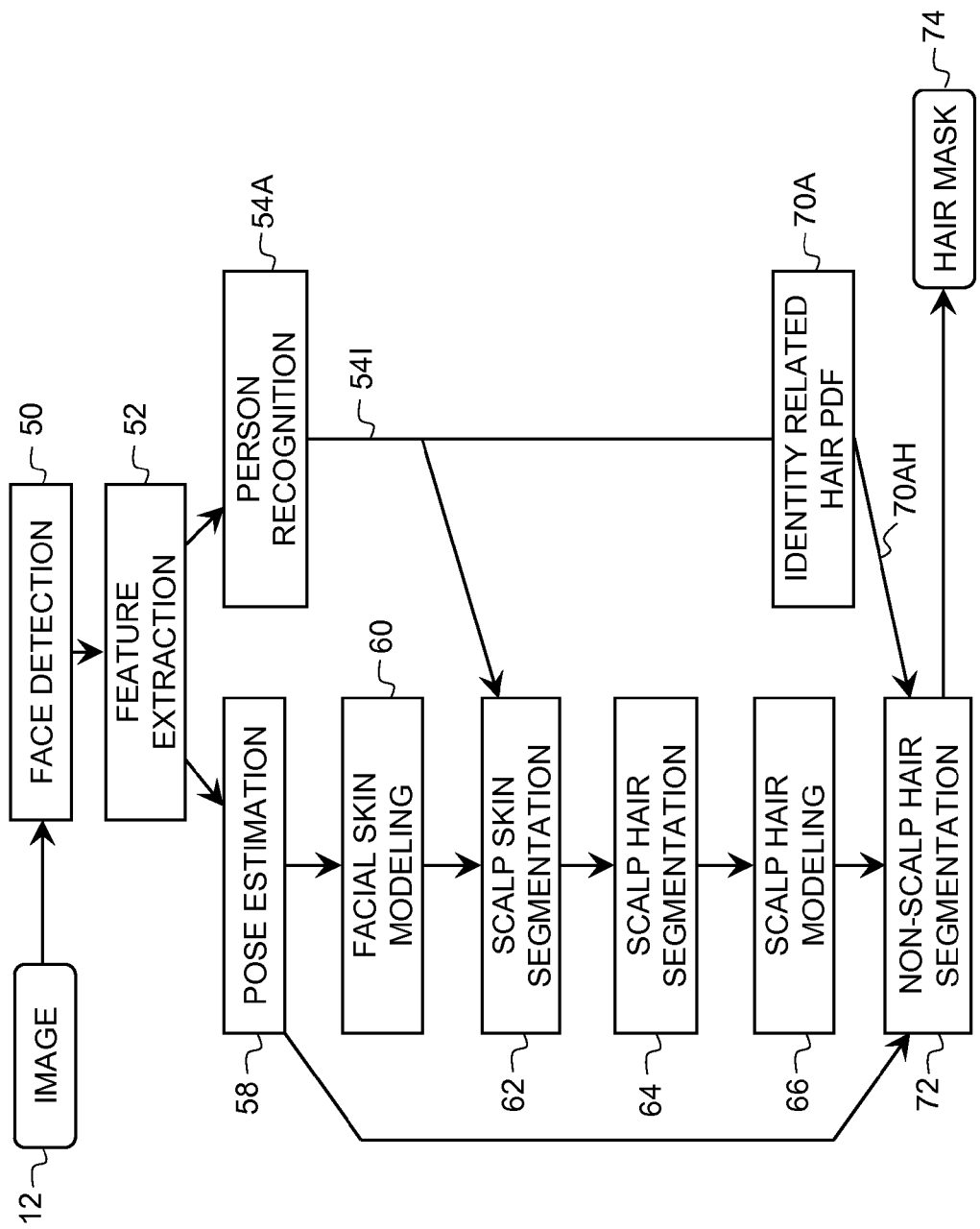
FIG. 3A is a logic flow diagram showing various types of data that can be used in another embodiment.

FIG. 3A depicts an alternative to the method shown in FIG. 3 wherein, rather than estimating the age and gender of the subject in a age/gender estimations step 54, a face recognition step 54A is employed to determine the identity 54I and identity information 54I is used in a related hair identification step 70A to help determine a hair distribution 70AH PDF for the distribution of hair of the subject.

Figure 4:
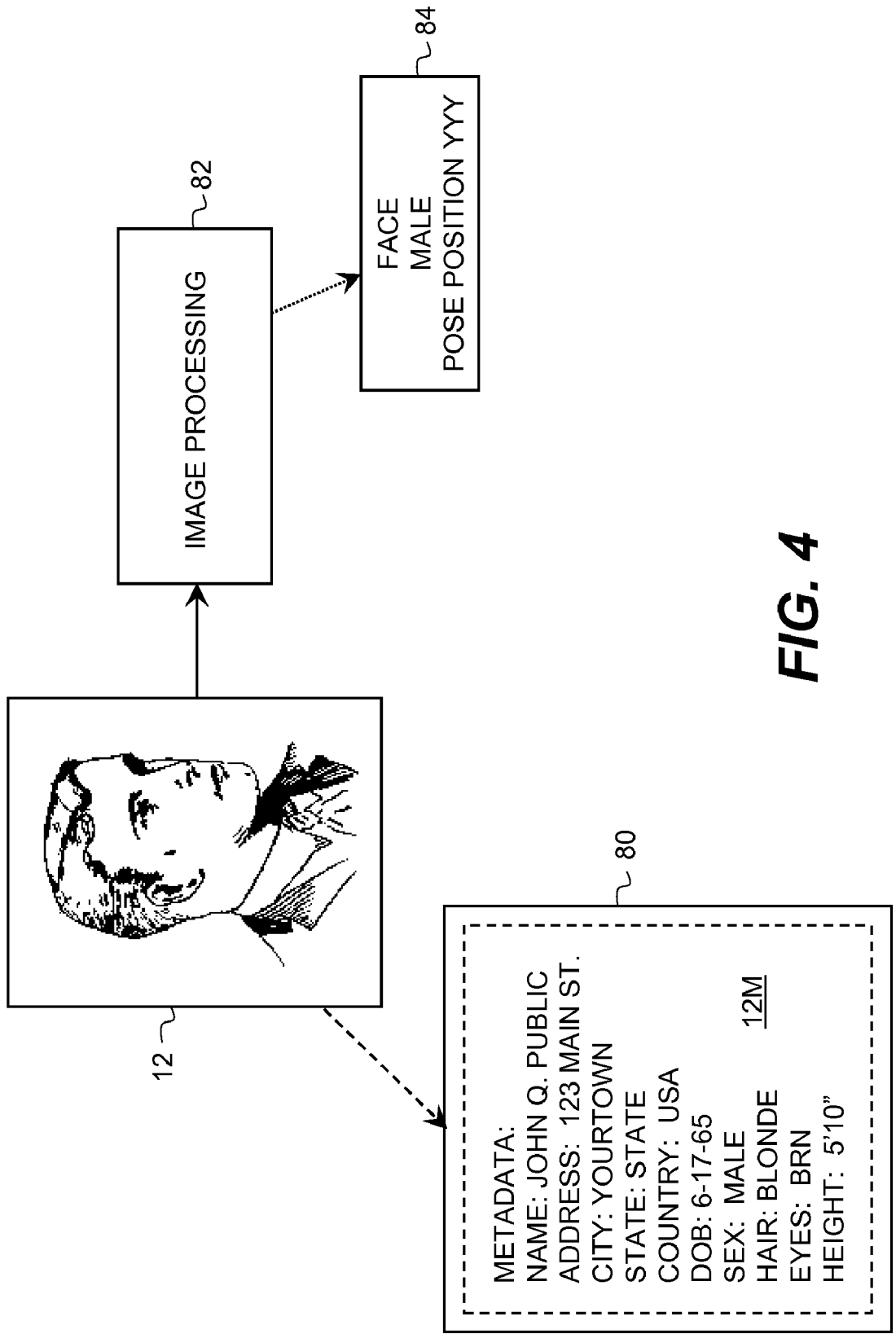
FIG. 4 is a schematic diagram showing various types of data that can be obtained related to the image.

FIG. 4 illustrates yet other alternative embodiments of the present invention wherein the method of the present invention employs both stored metadata 12M associated with an image 12 and semantic information 12S about the image 12 obtained by image processing. Referring to FIG. 4, there is shown a metadata data record 80 that is stored and is associated with image 12 and that contains metadata 12M. In addition to metadata 12M, however, Image processing 82, using any of a number of known techniques, can additionally provide image extracted semantic data 84 from analysis of image content. Both metadata 12 and extracted semantic data 84 obtained from the image 12 itself. The combination of metadata 12M and extracted semantic data 84 may then be used, as described above with regard to FIGS. 3 and 3A, for the task of identifying a hair region 44H in an expected hair region 42E, or a hair mask 74 delineating the hair region 44H.

Figure 5A:
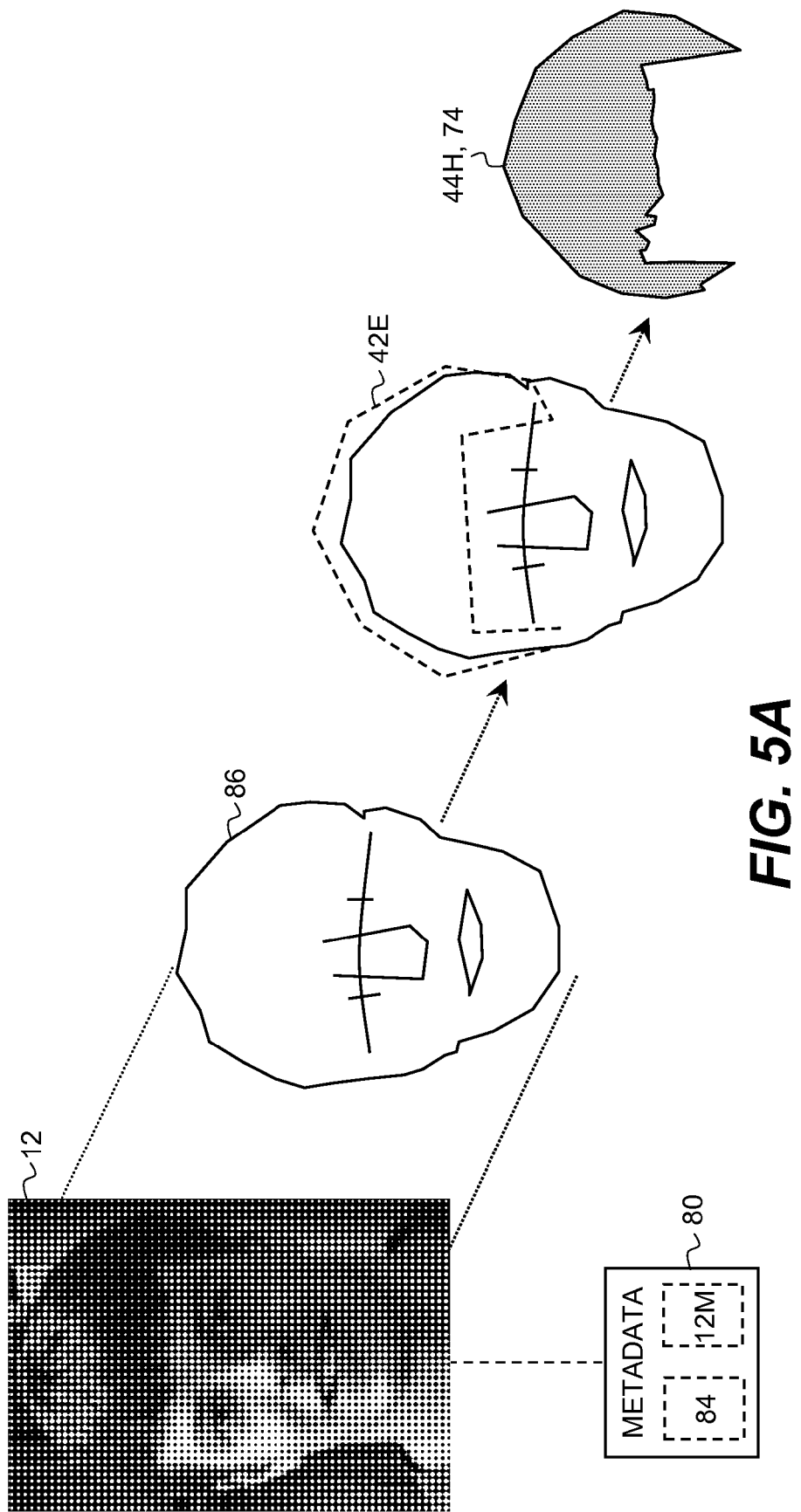
FIGS. 5A and 5B, are examples that show some of the logic steps followed for hair detection in various embodiments.
Figure 5B:
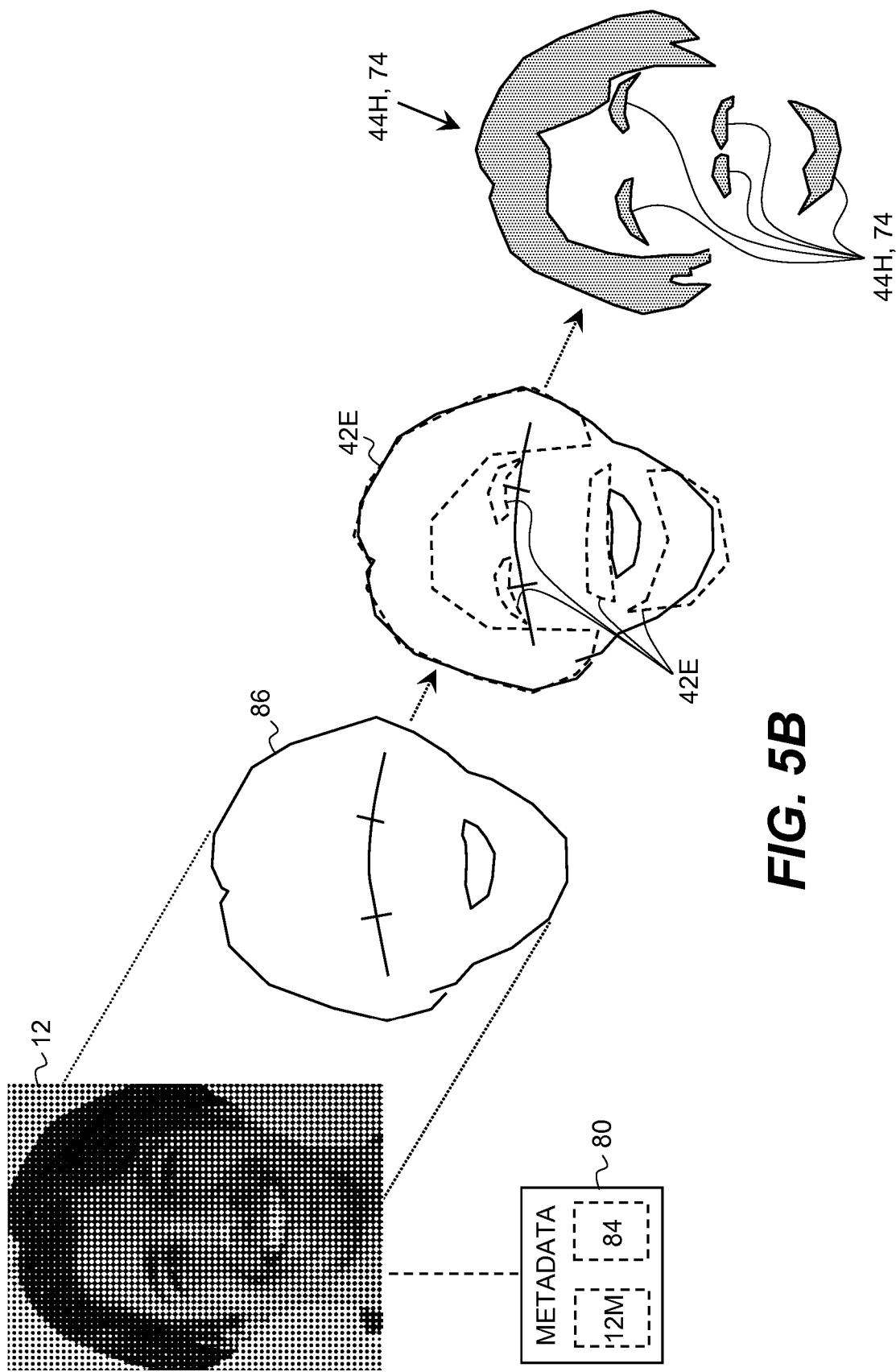

FIGS. 5A and 5B illustrate yet further embodiments of the method of the present invention for identifying hair regions in an image that has been described above with reference to FIGS. 2, 3 and 3A. In the embodiment illustrated in FIG. 5A, a metadata data record 80 is optionally associated with an image 12 and contains either or both of metadata 12M and extracted semantic metadata 84 and the image 12 and metadata from metadata data record 80 are processed according to the methods illustrated in FIG. 3 and 3A. In this embodiment, however, face detection step 50 and feature extraction step 52 operate to define an overall face structure 86 that can include an outline of the overall shape of the face and of salient facial features. Age/gender estimation step 54 can then again use various cues in the image to determine the likely age and gender of the image 12 subject and pose estimation step 58 can then be applied to help orient the face for subsequent analysis. Scalp hair segmentation step 64 may then be executed to identify an expected hair region 42E and a hair region 44H as described with reference to FIGS. 3 and 3A, or a hair mask 74 delineating the hair region 44H.

FIG. 5B illustrates the above described methods of the present invention, and in particular the method of the present invention as illustrated in FIG. 5A, for the instance of a subject having facial hair as well as scalp hair. As illustrated therein, a metadata data record 80 is again optionally associated with an image 12 and again contains either or both of metadata 12M and extracted semantic metadata 84 and the image 12 and metadata from metadata data record 80 is again processed according to the methods illustrated in FIG. 3 and 3A. Face detection step 50 and feature extraction step 52 again operate to define an overall face structure 86 that can include an outline of the overall shape of the face and of salient facial features. Age/gender estimation step 54 can then again use various cues in the image to determine the likely age and gender of the image 12 subject and pose estimation step 58 can again be applied to help orient the face for subsequent analysis. As shown in FIG. 5B, however, the subject of image 12 has prominent eyebrow, mustache and beard hair areas and scalp hair segmentation step 64 according identifies multiple expected hair regions 42E and hair regions 44H as described with reference to FIGS. 3 and 3A, or a hair mask 74 delineating the hair regions 44H, and is assisted by image analysis and the optional metadata 12M and extracted semantic data It is to be understood that the exemplary embodiments are merely illustrative of the present invention and that many variations of the above-described embodiments can be devised by one skilled in the art without departing from the scope of the invention. It is therefore intended that all such variations be included within the scope of the following claims and their equivalents.

Parts List
10. Display
12. Digital image
22. System
24. Processor-accessible memory system
26. Data Processing System
28. User Interface System
30. Peripheral System
40. Identification step
42. Step
42E. Expected hair region
44. Hair region identification step
44H. Hair Region
46. Storage step
50. Face detection step
52. Feature extraction step
54. Age/gender estimation step
58. Pose estimation step
60. Facial skin modeling step
62. Segmentation step
64. Segmentation step
66. Scalp hair modeling step
70. Age/gender hair pdf step
72. Segmentation step
74. Hair mask
80. Data record
82. Image processing
84. Data
86. Face structure

What is claimed is:

1. A method for detecting scalp or facial hair of a human subject depicted in a digital image and implemented at least in part by a computer system, the method comprising the steps of:

obtaining a digital image from a digital image-record collection;

linking the digital image to a variable amount of image metadata including semantic information relating to the content of the image and structural information relating to conditions under which the image was captured;

identifying (a) gender information indicating a gender of the human subject, (b) age information indicating an age or approximate age of the human subject, or (c) hair characteristic information indicating a set of hair characteristics associated with the human subject;

identifying an expected-hair region within the digital image based at least upon the identified information, the expected-hair region inclusive of at least a portion of a head to the human subject;

identifying a hair region within the expected hair region; and using the information pertaining to the identified hair region with at least one of a computer software program and a computer-accessible memory to provide various functional outputs relative to the digital image.

2. The method for detecting scalp or facial hair of a human subject depicted in a digital image as recited in claim 1 further including the step of segmenting at least one of scalp and facial hair of a human subject depicted in the digital image, wherein the metadata indicating a possible distribution of at least one of scalp hair and facial hair of the subject comprises:

at least one of:
 (i) gender information indicating a gender of the human subject,
 (ii) age information indicating an age or approximate age of the human subject, and
 (iii) hair characteristic information representative of the at least one of the scalp hair and the facial hair of the subject.

3. The method for detecting scalp or facial hair of a human subject depicted in a digital image as recited in claim 1 further including the step of extracting from the metadata an identification of the human subject and indicating a possible distribution of at least one of scalp and facial hair based on the identification of the human subject.

4. The method for detecting scalp or facial hair of a human subject depicted in a digital image as recited in claim 1 further including the steps of segmenting at least one of scalp and facial hair of a human subject depicted in the digital image and extracting semantic data from the image by image analysis wherein the metadata indicating a possible distribution of at least one of scalp and facial hair of the subject.

5. The method for detecting scalp or facial hair of a human subject depicted in a digital image as recited in claim 4 further including the step of determining from the semantic data an indication of a possible distribution of at least one of scalp and facial hair of the subject according to at least one of:

(i) gender information indicating a gender of the human subject, (ii) age information indicating an age or approximate age of the human subject, and
(iii) hair characteristic information indicating a set of hair characteristics associated with the human subject.

6. The method for detecting scalp or facial hair of a human subject depicted in a digital image as recited in claim 5 further including the step of determining from the hair characteristic information a set of hair characteristics associated with the human subject according to at least one of:

the semantic data indicating a possible distribution of at least one of scalp and facial hair of the subject comprises:
at least one of:
    hue, texture, luminance, chromaticity, location and shape characteristics of at least one region of the image.

* * * * *